(12) United States Patent
Han et al.

(10) Patent No.: US 11,519,379 B1
(45) Date of Patent: Dec. 6, 2022

(54) HYDRAULIC POWER GENERATING SYSTEM

(71) Applicant: TRB Green Technology Co., Ltd., New Taipei (TW)

(72) Inventors: Chih-Shiang Han, New Taipei (TW); Min-Chieh Chuang, New Taipei (TW)

(73) Assignee: TRB Green Technology Co., Ltd., New Taipei (TW)

( * ) Notice: Subject to any disclaimer, the term of this patent is extended or adjusted under 35 U.S.C. 154(b) by 0 days.

(21) Appl. No.: 17/565,477

(22) Filed: Dec. 30, 2021

(30) Foreign Application Priority Data

Aug. 26, 2021 (TW) ................................. 110131591

(51) Int. Cl.
| | | |
|---|---|---|
| *F03B 13/18* | (2006.01) | |
| *H02K 1/2706* | (2022.01) | |
| *F15B 15/14* | (2006.01) | |
| *F15B 13/02* | (2006.01) | |
| *F15B 13/042* | (2006.01) | |

(52) U.S. Cl.
CPC ....... *F03B 13/1875* (2013.01); *H02K 1/2706* (2013.01); *F05B 2260/406* (2013.01); *F15B 13/021* (2013.01); *F15B 13/042* (2013.01); *F15B 15/149* (2013.01); *F15B 15/1428* (2013.01); *F15B 15/1447* (2013.01); *F15B 2211/20515* (2013.01); *F15B 2211/20561* (2013.01); *Y02E 10/30* (2013.01)

(58) Field of Classification Search
CPC ............ F03B 13/1875; F15B 2260/406; F15B 2211/20515; F15B 2211/20561; Y02E 10/30
See application file for complete search history.

(56) References Cited

U.S. PATENT DOCUMENTS

| | | | | |
|---|---|---|---|---|
| 3,515,889 | A | * 6/1970 | Kammerer | ............ F03B 13/187 290/53 |
| 4,277,690 | A | 7/1981 | Noren | |

(Continued)

FOREIGN PATENT DOCUMENTS

| | | |
|---|---|---|
| CN | 1404553 A | 3/2003 |
| CN | 104131944 A | 11/2014 |

(Continued)

*Primary Examiner* — Dustin T Nguyen
(74) *Attorney, Agent, or Firm* — Winston Hsu

(57) ABSTRACT

A hydraulic power generating system includes a hydraulic motor, a bidirectional generator connected to the hydraulic motor, a hydraulic cylinder, first and second tubes, a piston structure having a piston and first and second links, and a power driving device connected to the first link. The piston divides the hydraulic cylinder into first and second chambers. The first and second links are connected to the piston and disposed through the first and second chambers, respectively. The first tube is communicated with the first chamber and the hydraulic motor. The second tube is communicated with the second chamber and the hydraulic motor. When the power driving device drives the piston toward the first chamber, hydraulic oil is pumped to the hydraulic motor for rotating the bidirectional generator. When the power driving device drives the piston toward the second chamber, the hydraulic oil is pumped to rotate the bidirectional generator reversely.

6 Claims, 5 Drawing Sheets

(56) References Cited

U.S. PATENT DOCUMENTS

| | | | | |
|---|---|---|---|---|
| 8,587,143 B2* | 11/2013 | Skinner | .................. | F03B 15/02 |
| | | | | 60/413 |
| 8,667,786 B2* | 3/2014 | Zimmermann | ....... | F03B 13/187 |
| | | | | 60/452 |
| 10,461,592 B2* | 10/2019 | Klassen | .................. | H02K 9/00 |
| 2016/0164361 A1* | 6/2016 | Fukuyanagi | ........... | H02K 11/33 |
| | | | | 310/156.01 |
| 2022/0224211 A1* | 7/2022 | Weng | .................. | F03B 13/1815 |

FOREIGN PATENT DOCUMENTS

| | | | |
|---|---|---|---|
| CN | 110242486 A | | 9/2019 |
| FR | 2 479 343 A1 | | 10/1981 |
| GB | 2538548 A | | 11/2016 |
| TW | 202009368 A | | 3/2020 |
| TW | M619736 U | | 11/2021 |

\* cited by examiner

HYDRAULIC POWER GENERATING SYSTEM

BACKGROUND OF THE INVENTION

1. Field of the Invention

The present invention relates to a hydraulic power generating system, and more specifically, to a hydraulic power generating system utilizing a hydraulic motor to swing or rotate a bidirectional generator bidirectionally for generating electricity.

2. Description of the Prior Art

Wave energy conversion technology is used for converting wave energy into electricity. The wave energy is unstable and irregular but is inexhaustible in supply and always available for use. Therefore, wave energy conversion has a greater potential than any other ocean energy conversion.

In general, a hydraulic power generating system adopting the wave energy conversion technology usually includes a power driving device, a hydraulic driving member, and a generator member. The power driving device is disposed on the hydraulic driving member and is placed in the ocean, and the hydraulic driving member is communicated with the generator member. Accordingly, the power driving device can move upward and downward with ocean waves to drive the hydraulic driving member for generating electricity by the generator member. For ensuring that the generator member can keep rotating in the same direction to generate electricity steadily, it is necessary to additionally dispose hydraulic valve components (e.g., a reversing valve, a control valve, an accumulator, and a relief valve) between the hydraulic driving member and the generator member, so as to cause a complicated hydraulic circuit design and the problem that the aforesaid hydraulic valve components are damaged easily.

SUMMARY OF THE INVENTION

Therefore, it is an objective of the present invention to provide a hydraulic power generating system utilizing a hydraulic motor to swing or rotate a bidirectional generator bidirectionally for generating electricity, so as to solve the aforesaid problem.

For achieving the aforesaid purpose, the present invention provides a hydraulic power generating system including a hydraulic motor, a bidirectional generator, a hydraulic cylinder, a piston structure, a first tube, a second tube, and a power driving device. The bidirectional generator is connected to the hydraulic motor for rotating or swinging in a first direction or a second direction by the hydraulic motor to generate electricity. The hydraulic cylinder has hydraulic oil contained therein. The piston structure has a piston, a first link, and a second link. The piston is movably disposed in the hydraulic cylinder to divide the hydraulic cylinder into a first chamber and a second chamber. The first link and the second link are connected to two ends of the piston, respectively. The first link and the second link are disposed through the first chamber and the second chamber, respectively. The first tube is communicated with the first chamber and the hydraulic motor. The second tube is communicated with the second chamber and the hydraulic motor. The power driving device is connected to one of the first link and the second link for driving the piston to move back and forth in the hydraulic cylinder via the one of the first link and the second link. When the power driving device drives the piston to move toward the first chamber, the hydraulic cylinder pumps the hydraulic oil to the hydraulic motor through the first tube for rotating or swinging the bidirectional generator in the first direction by the hydraulic motor. When the power driving device drives the piston to move toward the second chamber, the hydraulic cylinder pumps the hydraulic oil to the hydraulic motor through the second tube for rotating or swinging the bidirectional generator in the second direction by the hydraulic motor.

According to an embodiment of the present invention, the power driving device is a buoy, a floating raft, a swinging board, or a swinging mechanism.

According to an embodiment of the present invention, when the piston is disposed at a middle position in the hydraulic cylinder, the first link and the second link occupy the same volume in the hydraulic cylinder and the first chamber and the second chamber have the same volume.

According to an embodiment of the present invention, the hydraulic power generating system further includes a supplement tank, a third tube, a fourth tube, and a pump. The supplement tank has supplement hydraulic oil contained therein. The third tube is communicated with the hydraulic motor and the supplement tank for transmitting internal leakage oil from the hydraulic motor to the supplement tank. The fourth tube is communicated with the first tube and the second tube. The pump is communicated with the supplement tank and the fourth tube. The pump provides a fixed pressure to pump the supplement hydraulic oil and the internal leakage oil back to the first tube and the second tube through the fourth tube.

According to an embodiment of the present invention, the hydraulic power generating system further includes at least one check valve disposed on the fourth tube for preventing the supplement hydraulic oil and the internal leakage oil from flowing back to the fourth tube.

According to an embodiment of the present invention, the hydraulic motor is a piston motor.

According to an embodiment of the present invention, the hydraulic power generating system further includes an accelerating device or a decelerating device disposed between the hydraulic motor and the bidirectional generator.

According to an embodiment of the present invention, the bidirectional generator includes a stator structure and a rotor structure. The stator structure includes a stator body and a plurality of stator coils. A plurality of stator slots is formed on the stator body. The plurality of stator coils is wrapped around the plurality of stator slots. The rotor structure includes a rotor body disposed in the stator body in a swingable or rotatable manner. The plurality of rotor slots is formed on the rotor body.

According to an embodiment of the present invention, the rotor structure further includes a plurality of permanent magnets respectively disposed inside the plurality of rotor slots, and a number of the plurality of permanent magnets is equal to a number of the plurality of rotor slots.

In summary, since the hydraulic power generating system provided by the present invention adopts the design that the hydraulic motor drives the bidirectional generator to keep rotating (or swinging) bidirectionally, the present invention can solve the prior art problem that the hydraulic valve components (e.g., a reversing valve, a control valve, an accumulator, and a relief valve) need to be additionally disposed between the hydraulic driving member and the generator member for ensuring that the generator member can keep rotating in the same direction. In such a manner, the present invention can efficiently avoid the valve damage problem to enhance durability of the hydraulic power generating system and can greatly simplify the hydraulic circuit design of the hydraulic power generating system.

These and other objectives of the present invention will no doubt become obvious to those of ordinary skill in the art after reading the following detailed description of the preferred embodiment that is illustrated in the various figures and drawings.

DETAILED DESCRIPTION

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "front", "back", etc., is used with reference to the orientation of the Figure (s) being described. The components of the present invention can be positioned in a number of different orientations. As such, the directional terminology is used for purposes of illustration and is in no way limiting. Accordingly, the drawings and descriptions will be regarded as illustrative in nature and not as restrictive. Also, the term "connect" or "couple" is intended to mean either an indirect or direct electrical/mechanical connection. Thus, if a first device is connected to or coupled to a second device, that connection may be through a direct electrical/mechanical connection, or through an indirect electrical/mechanical connection via other devices and connections.

Figure 1:
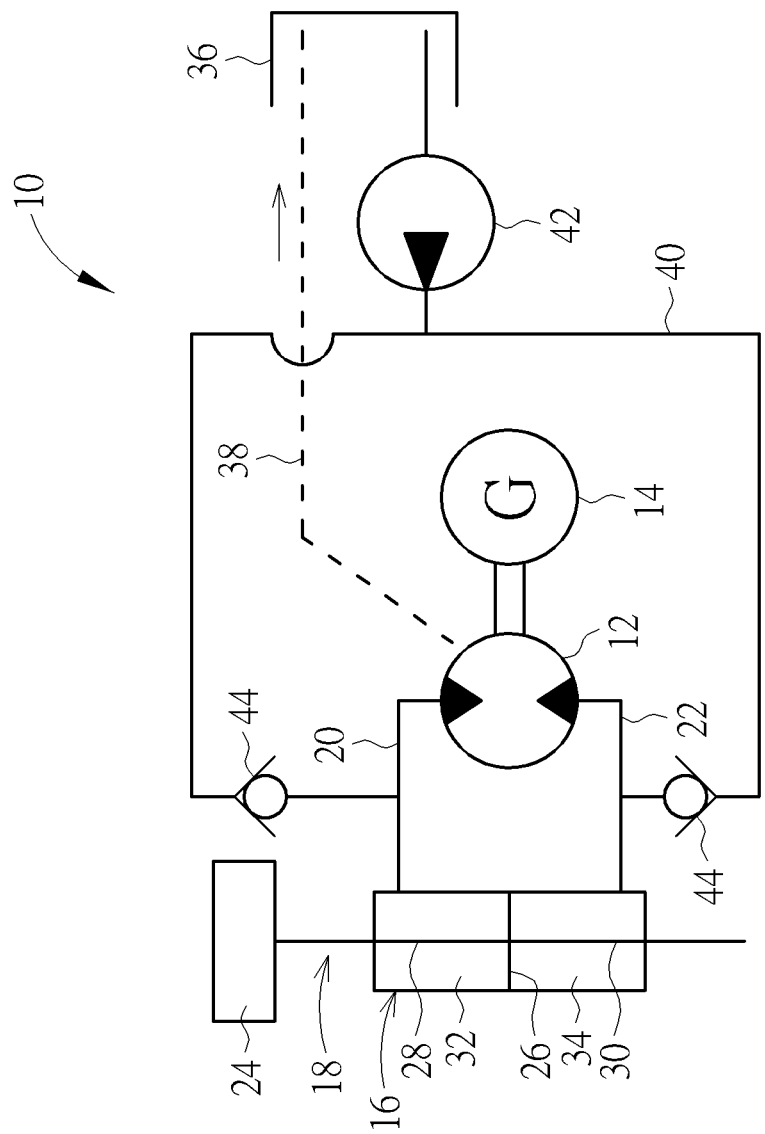
FIG. 1 is a schematic diagram of a hydraulic power generating system according to an embodiment of the present invention.

Please refer to FIG. 1, which is a schematic diagram of a hydraulic power generating system 10 according to an embodiment of the present invention. The hydraulic power generating system 10 could utilize wave energy of ocean waves to generate electricity, but not limited thereto, meaning that the present invention could be applied to other power generating device of utilizing wind energy, water energy, ocean energy, biogas energy, or biomass energy in another embodiment. The hydraulic power generating system 10 includes a hydraulic motor 12, a bidirectional generator 14, a hydraulic cylinder 16, a piston structure 18, a first tube 20, a second tube 22, and a power driving device 24. Preferably, the hydraulic motor 12 could be a piston motor. To be more specific, the hydraulic motor 12 could be a double swash plate axial piston motor. In this embodiment, the power driving device 24 could be preferably a floating body, but not limited thereto, meaning that the power driving device 24 could be a floating raft, a swinging board, or a swinging mechanism. That is, all the devices capable of utilizing kinetic energy (e.g., wave energy, wind energy, water energy, ocean energy, biogas energy, or biomass energy) to drive the piston structure 18 to perform a reciprocating motion could be adopted by the present invention, and the related description for the aforesaid power driving designs could be commonly seen in the prior art and omitted herein. The bidirectional generator 14 could be a generator apparatus capable of rotating or swinging bidirectionally and is connected to the hydraulic motor 12. Accordingly, during the process of the piston structure 18 compressing hydraulic oil in the hydraulic cylinder 16 to generate hydraulic energy and the hydraulic motor 12 transforming the hydraulic energy into mechanical energy, the bidirectional generator 14 can transform the mechanical energy into electricity by rotation of the hydraulic motor 12 for achieving the hydraulic power generating effect. To be more specific, the piston structure 18 has a piston 26, a first link 28, and a second link 30. The piston 26 is disposed in the hydraulic cylinder 16 to divide the hydraulic cylinder 16 into a first chamber 32 and a second chamber 34. The first link 28 and the second link 30 are connected to two ends of the piston 26 and are disposed through the first chamber 32 and the second chamber 34, respectively. As shown in FIG. 1, when the piston 26 is disposed at a middle position in the hydraulic cylinder 16, the first link 28 and the second link 30 occupy the same volume in the hydraulic cylinder 16, and the first chamber 32 and the second chamber 34 could preferably have the same volume. That is, when the piston 26 is disposed at the middle position in the hydraulic cylinder 16, the first chamber 32 and the second chamber 34 could have hydraulic oil with the same volume contained therein (but not limited thereto), so as to provide stable hydraulic energy to the hydraulic motor 12.

As shown in FIG. 1, the first tube 20 is communicated with the first chamber 32 and the hydraulic motor 12, and the second tube 22 is communicated with the second chamber 34 and the hydraulic motor 12. The power driving device 24 could be preferably connected to the first link 28, but the present invention is not limited thereto. That is, in another embodiment, the present invention could adopt the design that the power driving device 24 is connected to the second link 30. As for which connection design is adopted, it depends on the practical application of the hydraulic power generating system 10. Accordingly, when the power driving device 24 floats upward and downward with ocean waves, the power driving device 24 can drive the piston 26 to move upward and downward via the first link 28, so as to pump the hydraulic oil contained in the first chamber 32 and the second chamber 34 to the hydraulic motor 12 sequentially and periodically for transforming hydraulic energy into mechanical energy via the hydraulic motor 12. To be noted, the power driving design adopted by the present invention is not limited to the aforesaid design that the hydraulic cylinder 16 is disposed vertically as shown in FIG. 1 to make the power driving device 24 float upward and downward with ocean waves. In other words, the present invention could adopt other floater driving design commonly applied to wave energy conversion, such as the design that the hydraulic cylinder is disposed horizontally to make the power driving device move back and forth with ocean waves, and the related description could be reasoned by analogy according to FIG. 1 and omitted herein.

Via the aforesaid design, when the power driving device 24 moves upward with ocean waves for driving the piston 26 toward the first chamber 32, the hydraulic cylinder 16 can pump the hydraulic oil contained in the first chamber 32 to the hydraulic motor 12 via the first tube 20 for driving the hydraulic motor 12 to rotate (at this time, the second chamber 34 receives the hydraulic oil flowing back from the second tube 22). As such, the bidirectional generator 14 can rotate in a first direction (e.g. clockwise, but not limited thereto, meaning that the bidirectional generator 14 could adopt the swinging design and the related description is omitted herein since it is commonly seen in the prior art) to generate electricity by driving of the hydraulic motor 12. On the contrary, when the power driving device 24 moves downward with ocean waves for driving the piston 26 toward the second chamber 34, the hydraulic cylinder 16 can pump the hydraulic oil contained in the second chamber 34 to the hydraulic motor 12 via the second tube 22 for driving the hydraulic motor 12 to rotate (at this time, the first chamber 32 receives the hydraulic oil flowing back from the first tube 20). As such, the bidirectional generator 14 can rotate in a second direction (e.g. counterclockwise, but not limited thereto) to generate electricity by driving of the hydraulic motor 12. In such a manner, the hydraulic motor 12 can keep driving the bidirectional generator 14 to rotate bidirectionally for achieving the hydraulic power generating effect.

In summary, since the hydraulic power generating system provided by the present invention adopts the design that the hydraulic motor drives the bidirectional generator to keep rotating (or swinging) bidirectionally, the present invention can solve the prior art problem that the hydraulic valve components (e.g., a reversing valve, a control valve, an accumulator, and a relief valve) need to be additionally disposed between the hydraulic driving member and the generator member for ensuring that the generator member can keep rotating in the same direction. In such a manner, the present invention can efficiently avoid the valve damage problem to enhance durability of the hydraulic power generating system and can greatly simplify the hydraulic circuit design of the hydraulic power generating system.

In practical application, as shown in FIG. 1, the hydraulic power generating system 10 could further include a supplement tank 36, a third tube 38, a fourth tube 40, and a pump 42. The supplement tank 36 has supplement hydraulic oil contained therein. The third tube 38 is communicated with the hydraulic motor 12 and the supplement tank 36 for transmitting internal leakage oil from the hydraulic motor 12 to the supplement tank 36. The fourth tube 40 is communicated with the first tube 20 and the second tube 22. The pump 42 is communicated with the supplement tank 36 and the fourth tube 40. As such, when internal oil leakage occurs in the hydraulic motor 12, the pump 42 can provide a fixed pressure to pump the supplement hydraulic oil and the internal leakage oil from the third tube 38 back to the first tube 20 and the second tube 22 through the fourth tube 40, so as to keep the hydraulic motor 12 receiving enough hydraulic oil from the hydraulic cylinder 16. Accordingly, the present invention can surely prevent insufficient hydraulic power generation caused by internal oil leakage. Moreover, the hydraulic power generating system 10 could further include at least one check valve 44 (two shown in FIG. 1, but not limited thereto). The check valve 44 is disposed on the fourth tube 40 for preventing the supplement hydraulic oil and the internal leakage oil from flowing back to the fourth tube 40, so as to avoid the problem that the pumping efficiency of the hydraulic cylinder 16 is reduced due to backflow of the hydraulic oil. To be noted, the supplement tank and the check valve could be omitted for simplifying the hydraulic circuit design of the present invention.

In addition, the hydraulic power generating system 10 could further include an accelerating device or a decelerating device (not shown in the figures) disposed between the hydraulic motor 12 and the bidirectional generator 14. The aforesaid accelerating device could be a gear accelerating device, and the aforesaid decelerating device could be a gear decelerating device. In such a manner, when the hydraulic cylinder 16 provides the hydraulic energy to the hydraulic motor 12, the hydraulic motor 12 can transform the hydraulic energy into mechanical energy by torque and rotation speed, and then the bidirectional generator 14 can transform the mechanical energy into electricity. The aforesaid accelerating or decelerating device is configured to match with the specification and economic benefit of the hydraulic motor 12 or the bidirectional generator 14 for ensuring smooth energy transformation between the hydraulic motor 12 and the bidirectional generator 14, but the present invention is not limited thereto.

Figure 2:
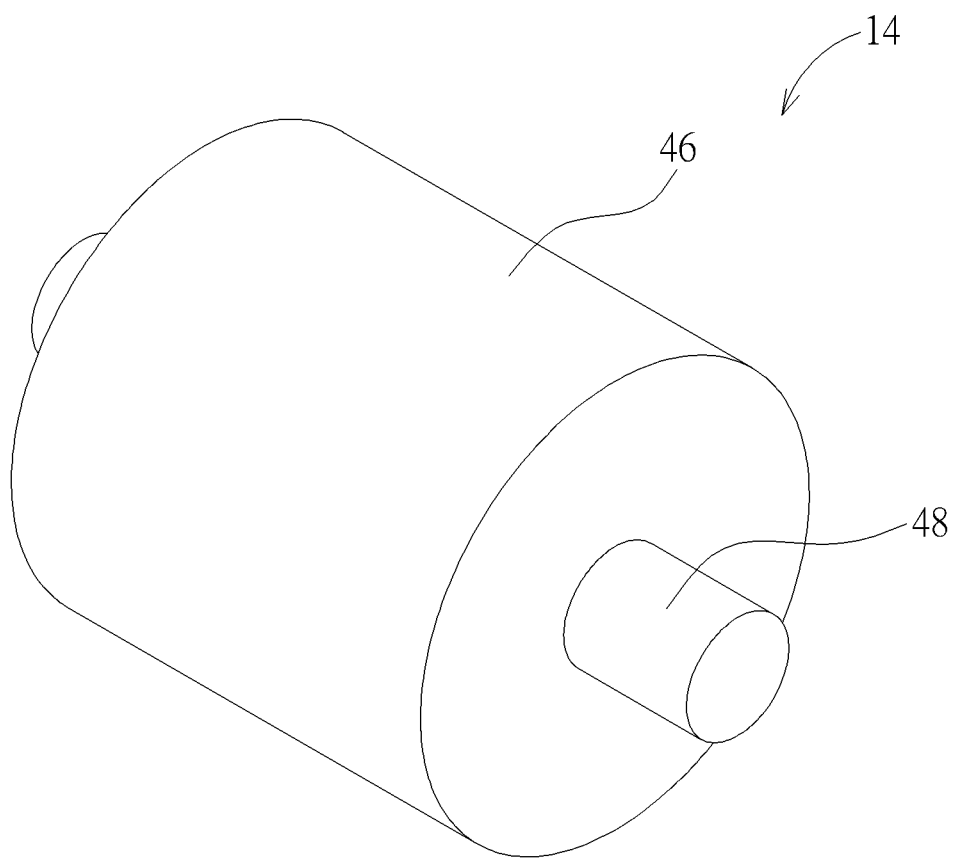
FIG. 2 is a diagram of a bidirectional generator in FIG. 2.
Figure 3:
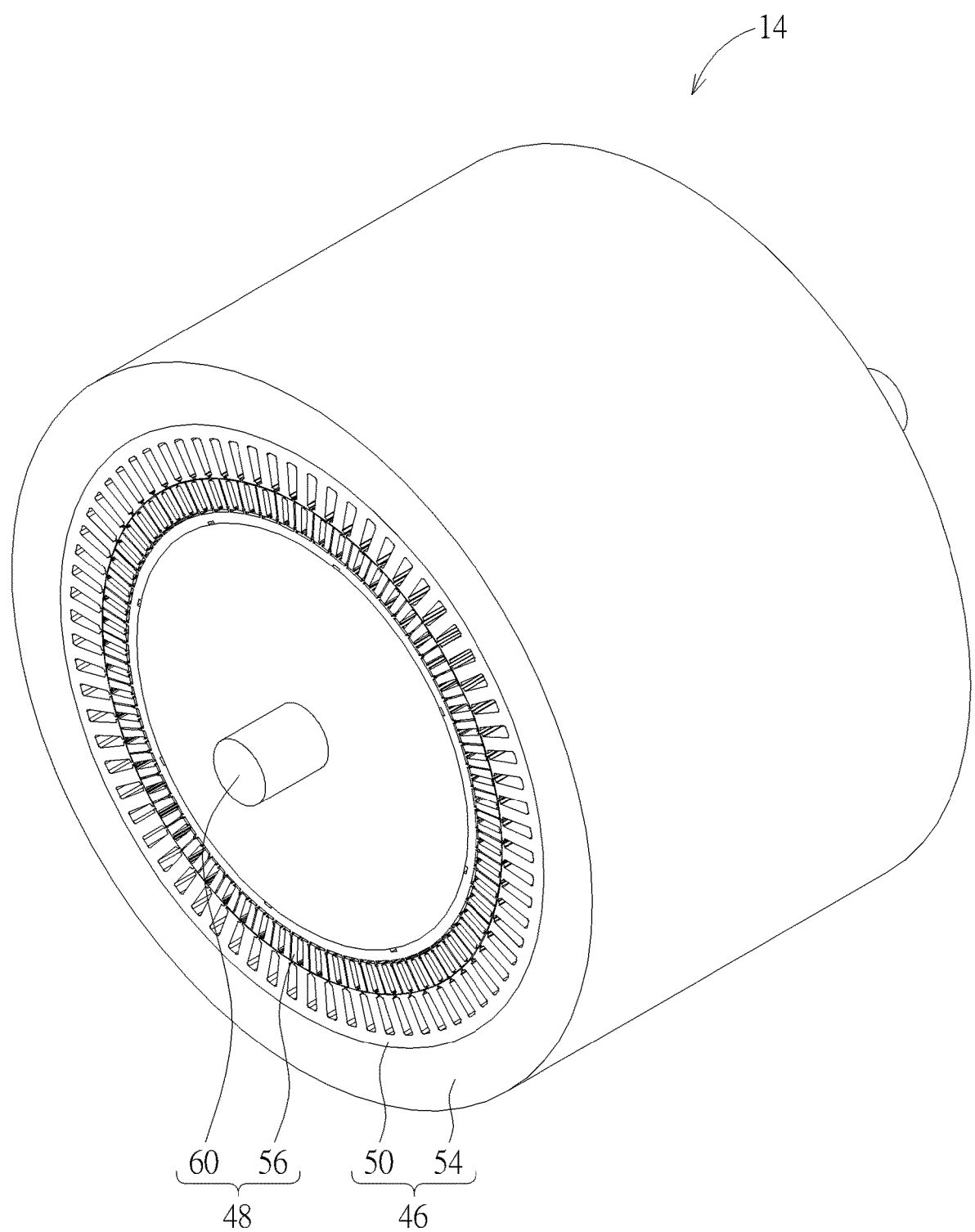
FIG. 3 is a partial diagram of the bidirectional generator in FIG. 2.
Figure 4:
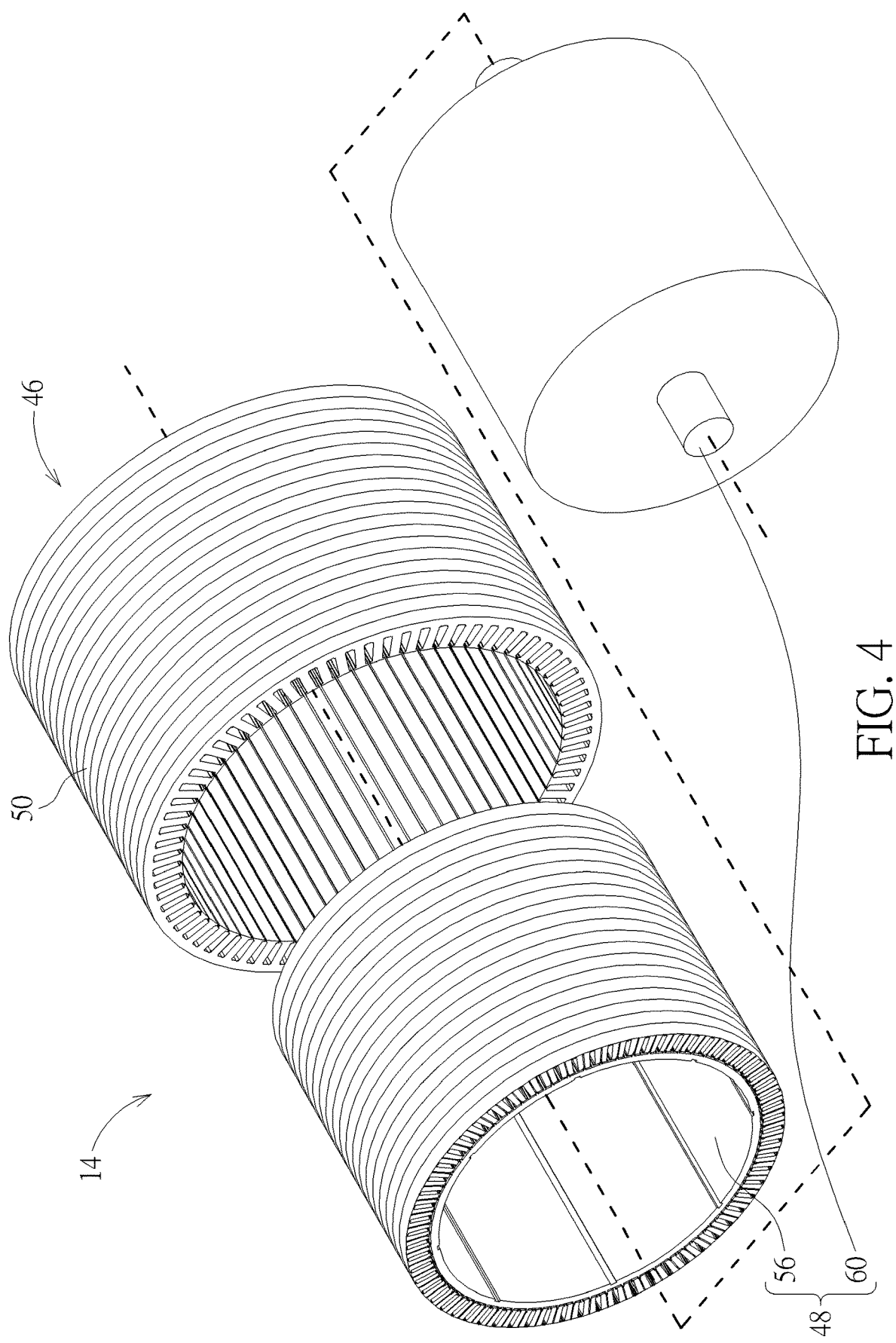
FIG. 4 is a partial exploded diagram of the bidirectional generator in FIG. 2.
Figure 5:
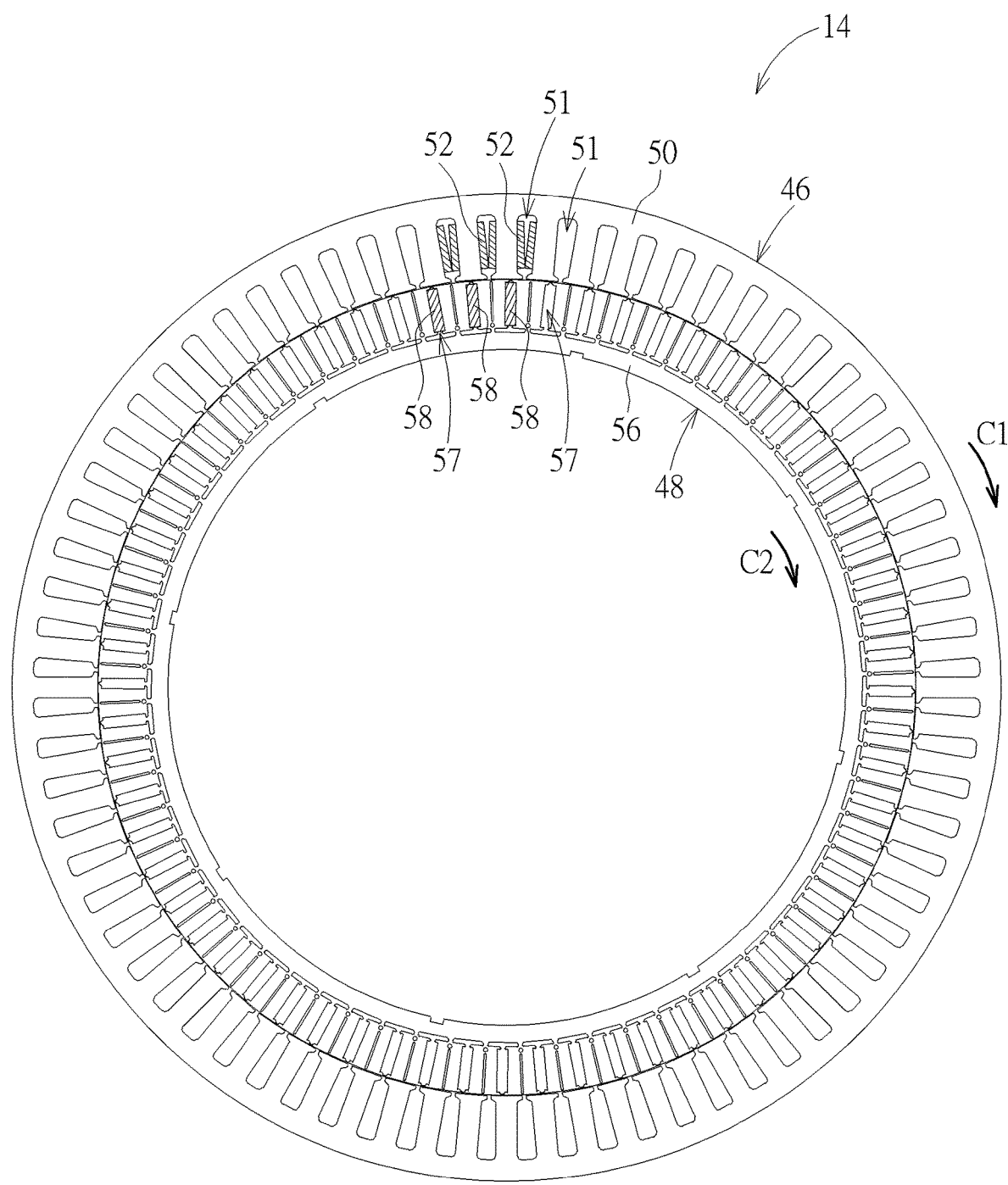
FIG. 5 is a partial cross-sectional diagram of the bidirectional generator in FIG. 2.

It should be mentioned that the present invention could further adopt the design in which the bidirectional generator can generate electricity by low angle rotation. For example, please refer to FIG. 2, FIG. 3, FIG. 4, and FIG. 5. FIG. 2 is diagram of the bidirectional generator 14 in FIG. 1. FIG. 3 is a partial diagram of the bidirectional generator 14 in FIG. 2. FIG. 4 is a partial exploded diagram of the bidirectional generator 14 in FIG. 2. FIG. 5 is a partial cross-sectional diagram of the bidirectional generator 14 in FIG. 2.

As shown in FIGS. 2-5, the bidirectional generator 14 could include a stator structure 46 and a rotor structure 48. The rotor structure 48 can rotate or swing relative to the stator structure 46. The bidirectional generator 14 can utilize the stator structure 46 to generate an electrical current by a magnetic field variation during a rotating movement or a swinging movement of the rotor structure 48 relative to the stator structure 46, so as to achieve the electricity generation purpose.

The stator structure 46 includes a stator body 50, a plurality of stator coils 52, and a casing 54. The stator body 50 is fixed in the casing 54, and a plurality of stator slots 51 is formed on the stator body 50. The plurality of stator coils 52 is wrapped around the plurality of stator slots 51 for induction power generation. Preferably, the stator body 50 could be a circular column made of magnetic material, such as silicon steel. Specifically, the stator body 50 could be formed by a plurality of stacked ring-shaped silicon steel sheets.

The rotor structure 48 includes a rotor body 56 and a plurality of permanent magnets 58. The rotor body 56 is disposed in the stator body 50 in a rotatable or swingable manner. A plurality of rotor slots 57 is formed on the rotor body 56. The plurality of permanent magnets 58 is disposed inside the plurality of rotor slots 57, respectively. The plurality of permanent magnets 58 is configured to cause a magnetic flux variation when the rotor body 56 rotates. Preferably, a number of the plurality of permanent magnets 58 could be identical to a number of the plurality of rotor slots 57. However, in another embodiment, the number of the plurality of permanent magnets 58 could be less than the number of the plurality of rotor slots 57. Preferably, the rotor body 56 could be a circular column made of magnetic material, such as silicon steel. Specifically, the rotor body 56 could be formed by a plurality of stacked ring-shaped silicon steel sheets.

In this embodiment, a central axis of the stator body 50 coincides with a central axis of the rotor body 56. The plurality of stator slots 51 is arranged along a circumferential direction C1 of the stator body 50, and the plurality of rotor slots 57 is arranged along a circumferential direction C2 of the rotor body 56. Preferably, the plurality of stator slots 51 could be arranged along the circumferential direction C1 of the stator body 51 at equal intervals, and the plurality of rotor slots 57 could be arranged along the circumferential direction C2 of the rotor body 56 at equal intervals.

It should be mentioned that, in the present invention, as shown in FIG. 5, a ratio of the number of the plurality of rotor slots 57 to the number of the plurality of stator slots 51 is 8:9 (but not limited thereto). Preferably, the number of the plurality of rotor slots 57 is at least equal to 64, and the number of the plurality of stator slots 51 is at least equal to 72. Due to the aforementioned configuration, the bidirectional generator 14 of the present invention not only generates electricity stably even in a condition of a low speed and a small angle of the rotating movement or the swinging movement of the rotor body 56 relative to the stator body 50, but also has better electricity generating efficiency. In other words, in the condition of the low speed and the small angle of the rotating movement or the swinging movement of the rotor body 56 relative to the stator body 50, the magnetic flux variation of bidirectional generator 14 of the present invention still can cause the stator structure 46 to generate an electrical current, so that the present invention is advantageous to wave energy conversion. For example, when the number of the plurality of the rotor slots 57 and the number of the plurality of the stator slots 51 are equal to 64 and 72, respectively, the stator coils 52 can generate the electrical current as long as the angle of the rotating movement or the swinging movement of the rotor body 56 relative to the stator body 50 reaches 22.5 degrees. Therefore, even if the rotor body 56 is driven by ocean waves to swing back and forth relative to the stator body 50 at a small angle instead of rotating at a large angle, the bidirectional generator 14 of the present invention still can generate electricity. Furthermore, it could be understood that when the number of the plurality of the rotor slots 57 and the number of the plurality of the stator slots 51 are greater than 64 and 72, respectively, the angle of the rotating movement or the swinging movement of the rotor body 56 relative to the stator body 50 which is required for the stator coils 52 to generate the electrical current could be less than 22.5 degrees, which allows the bidirectional generator 14 to generate electricity when the rotor body 56 is driven by ocean waves to swing back and forth relative to the stator body 50 at a smaller angle.

However, the structural design of the bidirectional generator of the present invention is not limited to the aforementioned embodiment. It depends on practical demands. For example, in another embodiment, each of the rotor body and the stator body could be formed by a plurality of stacked sector-shaped silicon steel sheets. Moreover, as shown in FIG. 3 and FIG. 4, the rotor structure 48 could further include a connection shaft 60 coupled to the rotor body 56. The connection shaft 60 is disposed through the casing 54 and is connected to the hydraulic motor 12 for rotating the bidirectional generator 14 to generate electricity by driving of the hydraulic motor 12.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A hydraulic power generating system comprising:
   a hydraulic motor;
   a bidirectional generator connected to the hydraulic motor, for rotating or swinging in a first direction or a second direction by the hydraulic motor to generate electricity, the bidirectional generator comprising:
      a stator structure comprising a stator body and a plurality of stator coils, a plurality of stator slots being formed on the stator body, the plurality of stator coils being wrapped around the plurality of stator slots, and a number of the plurality of stator coils being equal to a number of the plurality of stator slots; and
      a rotor structure comprising a rotor body disposed in the stator body in a swingable or rotatable manner, a plurality of rotor slots being formed on the rotor body, the rotor structure further comprising a plurality of permanent magnets respectively disposed inside the plurality of rotor slots, a number of the plurality of permanent magnets being equal to a number of the plurality of rotor slots, and the number of the plurality of rotor slots being at least equal to 64;
   a hydraulic cylinder having hydraulic oil contained therein;
   a piston structure having a piston, a first link, and a second link, the piston being movably disposed in the hydraulic cylinder to divide the hydraulic cylinder into a first chamber and a second chamber, the first link and the second link being connected to two ends of the piston, respectively, and the first link and the second link being disposed through the first chamber and the second chamber, respectively;
   a first tube communicated with the first chamber and the hydraulic motor;
   a second tube communicated with the second chamber and the hydraulic motor; and
   a power driving device connected to one of the first link and the second link, for driving the piston to move back and forth in the hydraulic cylinder via the one of the first link and the second link;
   wherein when the power driving device drives the piston to move toward the first chamber, the hydraulic cylinder pumps the hydraulic oil to the hydraulic motor through the first tube for rotating or swinging the bidirectional generator in the first direction by the hydraulic motor;
   when the power driving device drives the piston to move toward the second chamber, the hydraulic cylinder pumps the hydraulic oil to the hydraulic motor through the second tube for rotating or swinging the bidirectional generator in the second direction by the hydraulic motor.

2. The hydraulic power generating system of claim 1, wherein the power driving device is a buoy, a floating raft, a swinging board, or a swinging mechanism.

3. The hydraulic power generating system of claim 1, wherein when the piston is disposed at a middle position in the hydraulic cylinder, the first link and the second link occupy the same volume in the hydraulic cylinder and the first chamber and the second chamber have the same volume.

4. The hydraulic power generating system of claim 1 further comprising:
   a supplement tank having supplement hydraulic oil contained therein;
   a third tube communicated with the hydraulic motor and the supplement tank, for transmitting internal leakage oil from the hydraulic motor to the supplement tank;
   a fourth tube communicated with the first tube and the second tube; and
   a pump communicated with the supplement tank and the fourth tube, the pump providing a fixed pressure to pump the supplement hydraulic oil and the internal leakage oil back to the first tube and the second tube through the fourth tube.

5. The hydraulic power generating system of claim 4 further comprising:
   at least one check valve disposed on the fourth tube, for preventing the supplement hydraulic oil and the internal leakage oil from flowing back to the fourth tube.

6. The hydraulic power generating system of claim 1, wherein the hydraulic motor is a piston motor.

* * * * *